Patented Dec. 30, 1941

2,268,419

UNITED STATES PATENT OFFICE 2,268,419

ANTIAGER

Philip T. Paul, Naugatuck, Conn., assignor to United States Rubber Company, New York, N. Y., a corporation of New Jersey No Drawing. Application October 28, 1938, Serial No. 237,465

10 Claims. (Cl. 23—250)

This invention relates to a new class of deterioration retarders.

An object of the invention is to provide a new class of anti-oxidants or age resistors for organic substances which tend to deteriorate by absorption of oxygen from the air, for example, goods of rubber or allied gums, unsaturated fatty oils such as unsaturated vegetable oils, essential oils, petroleum oils and their derivatives such as gasolines, soaps, aldehydes, synthetic resins, turpentine, paints and varnishes containing drying oils, and the like. A further object of the invention is to provide chemicals which additionally act as flex improvers or anti-flex cracking agents for vulcanized rubber such as tire treads which undergo repeated strains during use. Further objects will be apparent from the following description.

According to the invention, the organic substance is treated with a 1-nitroso-2,2,4-trialkyl-1-2 dihydro quinoline having the general formula

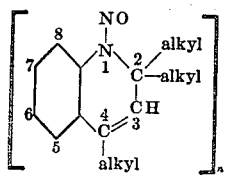

where $n$ is one or a multiple of one as in the case of a polymer. The benzene nucleus may be unsubstituted or substituted in one or more of the positions 5, 6, 7, 8 as by alkyl, aryl, aralkyl, halogen, hydroxy, alkoxy, aryloxy, benzo, alkenyl, primary amino, secondary alkyl substituted amino, tertiary alkyl substituted amino, secondary aryl substituted amino, tertiary aryl substituted amino, mercapto, nitro, etc. Examples of such radicals are methyl, phenyl, benzyl, chloro, hydroxy, methoxy, ethoxy, phenoxy, isopropenyl, amino, methyl amino, dimethyl amino, anilino, diphenylamino, mercapto, nitro.

Among such examples are 1-nitroso-2,2,4-trimethyl-1,2 dihydro - 6 - ethoxy quinoline 1-nitroso-2,2,4-trimethyl-1,2 dihydro - 6 - phenyl quinoline 1-nitroso-2,2,4-trimethyl-1,2 dihydro quinoline (polymerized)

1-nitroso-2,2,4-trimethyl-1,2 dihydro - 6 - methyl quinoline 1-nitroso-2,2,4-trimethyl-1,2 dihydro - 7 - anilino quinoline 1-nitroso-2,2,4-triethyl - 1,2 dihydro - 8 - hydroxy quinoline 1-nitroso-2,2,4-trimethyl - 1,2 dihydro - 4 - chloro quinoline The following is given in illustration of the preparation of the chemicals:

(A) Preparation of 1-Nitroso-2,2,4-Trimethyl-1,2 Dihydro-6-Ethoxy Quinoline 2,2,4-trimethyl-1,2-dihydro-6-ethoxy quinoline (29 grams) is dissolved in a mixture of 25 ccs. dioxane and 20 ccs. glacial acetic acid, and the solution cooled in an ice bath to 5° C. With stirring a solution of 10.65 grams of 95% sodium nitrite in a minimum amount of water is slowly run in. The temperature is not allowed to rise above 10° C. After all the sodium nitrite has been added the mixture is allowed to stand for an hour. Approximately a liter of water is added and the nitroso body extracted with ether. The ether solution is washed, dried and the ether removed by heating in vacuo on a water bath held at 50–60° C. The residue, a deep red syrup consisting essentially of 1-nitroso-2,2,4-trimethyl-1,2 dihydro-6-ethoxy quinoline, is suitable for use in rubber.

(B) Preparation of 1-Nitroso-2,2,4-Trimethyl-1,2 Dihydro-Quinoline (Polymerized)

Polymerized 2,2,4-trimethyl-1,2 dihydro-quinoline (36.6 grams) is dissolved in a mixture of 75 ccs. dioxane and 25 ccs. glacial acetic acid, and treated as described above with 16 grams sodium nitrite. The residue from the ether evaporation on standing becomes a brittle mass melting 75–80° C. It consists essentially of polymerized 1-nitroso-2,2,4-trimethyl-1,2 dihydro quinoline and is suitable as such for use in rubber.

(C) Preparation of 1-Nitroso-2,2,4-Trimethyl-1,2 Dihydro-6-Phenyl Quinoline 2,2,4-trimethyl-1,2 dihydro-6-phenyl quinoline (25 grams) is dissolved in a mixture of 50 ccs. dioxane and 25 ccs. glacial acetic acid, and the solution cooled to 5° C. With stirring a solution of 8.3 grams of sodium nitrite in a minimum amount of water are slowly added. The temperature was not allowed to rise above 10° C. Towards the end of the addition of the sodium nitrite, the nitroso derivative separated out. Stirring was continued for half an hour after all the sodium nitrite had been added. The crude nitroso body was filtered off and recrystallized from alcohol. It forms bright yellow crystals, melting 98–99° C.

The effectiveness of the chemicals of this class for retarding the oxidation of rubber is illustrated by the results of standard ageing tests on commercial rubber compounds, the parts being by weight:

*Mix master batch*

| | Parts |
|---|---|
| Smoked sheets | 100 |
| Carbon black | 45 |
| Zinc oxide | 5 |
| Pine tar | 3.50 |
| Zinc soap of cocoanut oil acids | 3.50 |
| Sulfur | 3.00 |
| Mercaptobenzothiazole | 1.00 |
| | 161.00 |

To this master batch the three compounds whose preparation has been described were added in the proportion of 1 part to 100 parts by weight of rubber. The per cent remaining tensile on the resulting mixes before and after ageing 96 hours under 300 pounds oxygen at 70° C. are as follows:

| | Control | 1-nitroso-2,2,4-trimethyl-1,2 dihydro-6-ethoxy quinoline |
|---|---|---|
| Unaged | 100 | 100 |
| Aged | 16 | 33 |

| | Control | 1-nitroso-2,2,4-trimethyl-1,2 dihydro quinoline (polymerized) |
|---|---|---|
| Unaged | 100 | 100 |
| Aged | 16 | 47 |

| | Control | 1-nitroso-2,2,4-trimethyl-1,2 dihydro-6-phenyl quinoline |
|---|---|---|
| Unaged | 100 | 100 |
| Aged | 16 | 47 |

Stocks containing the above mentioned antioxidants are also superior to the control in resisting deterioriation due to flex-cracking and to ageing at 100° C.

Incident to their use in paints and varnishes, the materials may be used as controllers of oxidation to regulate the rate of drying of finishes which dry by oxidation.

The invention may be applied for the preservation of natural and artificially-prepared rubbers, unvulcanized or vulcanized, including reclaims and latices of such rubbers.

It is also to be understood that other desired filling and compounding ingredients may be incorporated along with the preservative, for example, in the case of rubber, there may be incorporated other accelerators, softeners, etc.

The antioxidant may be incorporated in any type of rubber composition, such as those used for automobile tires and tubes, hose, belting, sheet and thread rubber, rubberized fabrics, molded goods, boots and shoes, etc., whether vulcanized in a mold, in open steam, in hot air, or in the cold by the so-called acid process. The proportion of the anti-oxidant may vary from about 0.1% to 5%, although either smaller or greater proportions may be found useful. If the material to which it is added is a liquid such as rubber cement or an oil, the antioxidant may be dissolved therein in a suitable small proportion. The antioxidant may be incorporated into solid substances by milling, dipping, or mastication, and prepared for incorporation into dispersions or solutions either in powder, paste or solution form, or applied in such forms for incorporation by diffusion, to the surfaces of vulcanized or unvulcanized rubber goods.

Having thus described my invention, what I claim and desire to protect by Letters Patent is:

1. The process of preserving organic substances which tend to deteriorate by absorption of oxygen from the air which comprises incorporating therein a 1-nitroso-2,2,4-trialkyl-1,2 dihydro quinoline.

2. The process of preserving organic substances which tend to deteriorate by absorption of oxygen from the air which comprises incorporating therein a polymerized 1-nitroso-2,2,4-trialkyl-1,2 dihydro quinoline.

3. The process of preserving organic substances which tend to deteriorate by absorption of oxygen from the air which comprises incorporating therein 1-nitroso-2,2,4-trimethyl-1,2 dihydro-6-ethoxy quinoline.

4. The process of preserving organic substances which tend to deteriorate by absorption of oxygen from the air which comprises incorporating therein 1-nitroso-2,2,4-trimethyl-1,2 dihydro quinoline.

5. The process of preserving organic substances which tend to deteriorate by absorption of oxygen from the air which comprises incorporating therein 1-nitroso-2,2,4-trimethyl 1,2 dihydro-6-phenyl quinoline.

6. An organic substance which tends to deteriorate by absorption of oxygen from the air in which has been incorporated a 1-nitroso-2,2,4-trialkyl-1,2 dihydro quinoline.

7. An organic substance which tends to deteriorate by absorption of oxygen from the air in which has been incorporated a polymerized 1-nitroso-2,2,4-trialkyl-1,2 dihydro quinoline.

8. An organic substance which tends to deteriorate by absorption of oxygen from the air in which has been incorporated 1-nitroso-2,2,4-trimethyl-1,2 dihydro-6-ethoxy quinoline.

9. An organic substance which tends to deteriorate by absorption of oxygen from the air in which has been incorporated 1-nitroso-2,2,4-trimethyl-1,2 dihydro quinoline.

10. An organic substance which tends to deteriorate by absorption of oxygen from the air in which has been incorporated 1-nitroso-2,2,4-trimethyl-1,2 dihydro-6-phenyl quinoline.

PHILIP T. PAUL.